United States Patent [19]

Ishiwatari

[11] Patent Number: 4,977,240

[45] Date of Patent: Dec. 11, 1990

[54] UNSATURATED ALKYD-CONTAINING ORGANIC PEROXIDE COMPOSITION

[75] Inventor: Akio Ishiwatari, Onoda, Japan

[73] Assignee: Kayaku Akzo Corporation, Tokyo, Japan

[21] Appl. No.: 433,051

[22] Filed: Nov. 7, 1989

[30] Foreign Application Priority Data

Nov. 11, 1988 [JP] Japan ................................. 63-283711

[51] Int. Cl.$^5$ ................................................ C08F 8/00
[52] U.S. Cl. ..................................... 528/493; 528/272; 528/296; 528/302; 528/303; 528/304; 528/308; 523/500; 523/526; 525/21; 525/27; 525/40; 525/49
[58] Field of Search ................... 528/272, 3, 296, 302, 528/303, 304, 308, 493; 523/500, 526; 525/21, 27, 40, 49

[56] References Cited

U.S. PATENT DOCUMENTS 4,042,646  8/1977  Edamura et al. ...................... 525/22
4,507,432  3/1985  Banno et al. ........................... 525/21
4,814,365  3/1989  Takiyama et al. .................. 523/514

FOREIGN PATENT DOCUMENTS 0239435  1/1964  Netherlands .

Primary Examiner—John Kight, III
Assistant Examiner—Sam A. Acquah
Attorney, Agent, or Firm—Richard P. Fennelly; Louis A. Morris

[57] ABSTRACT

A peroxide curing agent composition containing 20–90% of an unsaturated alkyd diluent which is fluid at room temperature, is disclosed. The curing agent is useful for the curing of unsaturated polyesters and eliminates the problem of the bleeding of harmful phthalate diluents from such cured polyesters, while providing excellent stability of the diluted peroxide.

7 Claims, No Drawings

UNSATURATED ALKYD-CONTAINING ORGANIC PEROXIDE COMPOSITION

The present invention relates to a curing agent composition for an unsaturated polyester resin characterized by comprising 10 to 80% by weight of an organic peroxide and 90 to 20% by weight of an unsaturated alkyd which is fluid at room temperature.

The unsaturated alkyd-containing organic peroxide composition is useful as a curing agent for the molding of an unsaturated polyester at room temperature or at elevated temperatures.

Generally, organic peroxides have been used as curing agents for the molding of unsaturated polyester resins (hereinafter abbreviated as "UP resin") at room temperature or at elevated temperatures, and examples of such an organic peroxide include ketone peroxides such as methyl ethyl ketone peroxide and methyl isobutyl ketone peroxide: alkyl peresters such as t-butyl-peroxy 2-ethylhexanoate and t-butyl-peroxy benzoate: percarbonates such as t-butylperoxy isopropyl carbonate, bis(4-t-butylcyclohexyl)peroxy dicarbonate; peroxy ketals such as 1,1-di-t-butyl-peroxy-3,3,5-trimethylcyclohexane and benzoyl peroxides such as benzoyl peroxide and o-methylbenzoyl peroxide. For safety reasons, these commercially available curing agents are used in a state diluted with a plasticizer or the like to a concentration of 10 to 80% by weight. The plasticizers which have been generally used as a diluent for the organic peroxide are phthalates such as dimethyl phthalate (hereinafter abbreviated to "DMP"), dibutyl phthalate (DBP) and dioctyl phthalate (DOP).

The above phthalates (hereinafter abbreviated to "APE") have a common disadvantage in that they are not radically polymerizable, so that the APE remaining in the cured UP resin adversely affects the physical properties of the molded article, or bleeds from the molded article. In addition, APE is poisonous. Some attempts have been made for improving the common disadvantage of organic peroxide curing agents due to the APE contained therein. For example, it has been attempted to use a fumarate, which does not contain the harmful phthalic acid group and is radically polymerizable, as a diluent for an organic peroxide instead of the APE. However, the use of a fumarate remarkably lowers the stability of an organic peroxide during storage, which is a barrier against the practical use thereof.

Further, it has also been attempted to use, as a diluent, an isoparaffin solvent which is thought to be less harmful than APE to the human body, although it is not radically polymerizable. However, the solubility of an isoparaffin solvent in the UP resin is remarkably lower than that of the APE, so that an isoparaffin solvent separates from a UP resin molded article and makes the surface of the article greasy. Thus, an isoparaffin solvent has not been used in practice as a diluent for an organic peroxide.

The inventors of the present invention have studied various compounds for the purpose of finding a diluent for an organic peroxide to be used as a curing agent, which is radically polymerizable, free from the harmful phthalic acid group, compatible with the UP resin and which can provide a low-viscosity organic peroxide liquid composition without lowering the stability of the organic peroxide, and have found that the use of an unsaturated alkyd which is fluid at room temperature satisfies these criteria. An unsaturated alkyd itself is known as the main component of a UP resin which is prepared by adding about 30% by weight of styrene monomer to the alkyd. Such an unsaturated alkyd is, however, solid at room temperature so that it is different from the unsaturated alkyd to be used in the present invention. When an unsaturated alkyd which is fluid at room temperature is used as a diluent for an organic peroxide, the stability of the organic peroxide is not lowered even after the lapse of time and the obtained UP resin molded article has better physical properties than those of an UP resin molded article produced by the use of a curing agent diluted with conventional APE. Generally, an unsaturated alkyd is a compound which is prepared by heating a mixture of a saturated dibasic acid such as phthalic anhydride or isophthalic acid, an unsaturated dibasic acid such as maleic anhydride or fumaric acid and a glycol such as ethylene glycol or propylene glycol at a molar ratio of 1:1:2 to carry out condensation through dehydration. This unsaturated alkyd is solid at room temperature and has a thermal deformation temperature of about 55 to 150° C. In contrast, the unsaturated alkyd of the present invention is fluid at room temperature and can be prepared by heating a mixture of a saturated dibasic acid such as azelaic or sebacic acid, an unsaturated dibasic acid such as maleic anhydride or fumaric acid and a glycol such as ethylene glycol or propylene glycol at a molar ratio 1:1:2 to carry out condensation through dehydration, as is well known (cf. H.V. Boening; Unsaturated Polyesters, p. 130). Alternatively, said unsaturated alkyd can be prepared by heating a mixture of a saturated dibasic acid such as phthalic anhydride or isophthalic acid, an unsaturated dibasic acid as maleic anhydride or fumaric acid and a glycol such as diethylene glycol or dipropylene glycol at a molar ratio of about 1:1:2 to carry out condensation through dehydration (cf. H.V. Boening. Unsaturated Polyesters, p. 95), so long as an alkyd which is fluid at room temperature is produced.

The organic peroxide composition containing, as a diluent, an unsaturated alkyd which is fluid at room temperature according to the present invention may be prepared either by feeding such an unsaturated alkyd into a reaction mixture as a diluent in the synthesis of an organic peroxide, or by preparing a pure organic peroxide and diluting it with a required amount of an alkyd as described above. There is no recognizable difference in quality between the organic peroxide compositions prepared by these two methods and they each exhibit a high degree of storage stability. When a commercially available UP resin is cured with the organic peroxide composition according to the present invention, the curing characteristics and the hardness of the cured product are superior to those of the UP resin cured by the use of a curing agent diluted with APE.

The organic peroxide to be used as a curing agent includes ketone peroxides such as methyl ethyl ketone peroxide (MEKP) and methyl isobutyl ketone peroxide (MIBKP): alkyl peresters such as t-butylperoxy 2-ethylhexanoate (BPO) and t-butylperoxy benzoate (TTBPB) and percarbonates such as t-butylperoxy isopropyl carbonate (TBIC). The content of an organic peroxide in the curing agent composition of the present invention is preferably 10 to 80% by weight, still more preferably 40 to 75% by weight. It is preferred to add the curing agent composition to the UP resin in an amount of 1 to 3 parts per 100 parts of said resin. Further, when an unsaturated alkyd which is fluid at room temperature is used as a diluent for an organic peroxide, an inhibitor such as 2,6-t-butylcresol (BHT) may be added in an amount of 0.01 to 3% by weight as a stabilizer. Even when the UP resin was cured with the curing agent composition thus obtained, no liquid diluent can be detected in the resulting cured product. The amount of the APE remaining in the UP resin molded article conventionally cured with a curing agent diluted with APE is about 0.2 to 1.0% by weight, though it varies depending upon the kind of the curing agent to be used and the molding method employed.

The present invention will now be described by referring to the following Synthesis Examples and Examples, wherein all parts and percentages are by weight.

SYNTHESIS EXAMPLE 1

Synthesis of unsaturated alkyd which is fluid at room temperature

A stirring rod, a condenser, an inert gas inlet tube and a thermometer were set on a 1-l four-necked flask. 138 parts (2.2 mol) of ethylene glycol, 98 parts (1 mol) of maleic anhydride and 188 parts (1 mol) of azelaic acid were introduced into the flask. The flask was heated on a water bath to 80 to 90° C., while slowly introducing nitrogen or carbon dioxide gas. In this step, the stirring of the contents became possible, so that the stirring was begun. The temperature was raised to 150 to 160° C. over a period of 1 to 1.5 hours and further raised to 190° C. over a period of 3 to 4 hours. An exothermic reaction began at about 100° C., so that the heating was controlled until the reaction slowed down.

After keeping the contents at 190° C. for one hour, the condenser was replaced by a siphon to reduce the pressure to 100 to 200 mmHg. During the reduction of the pressure, sampling was carried out and the reaction was continued until the acid value reached 50 or below. When the reaction mixture reached an objective acid value or viscosity, the temperature of the reaction mixture was lowered to 100° C. About 0.22 g of hydroquinone or p-t-butylcatechol was added to the resulting reaction mixture as a polymerization inhibitor to obtain 370 g of an unsaturated alkyd resin.

EXAMPLES 1 TO 7

Preparation of a curing agent diluted with an unsaturated alkyd which is fluid at room temperature (hereinafter abbreviated to "LUP")

EXAMPLE 1

129 parts (1 mol) of t-butyl hydroperoxide diluted with water to about 70% (TBHP-70) and 100 parts of water were fed into a 1-l glass beaker, followed by the addition of 182 parts of LUP. 160 parts (1 mol) of caustic soda diluted with water to 25% was added dropwise thereto, while keeping the contents at 20° C. on an ice-water bath. After the completion of the dropwise addition, 140 parts (1 mol) of benzoyl chloride was added dropwise thereto over a period of 30 minutes. The contents were stirred for 60 minutes, while keeping them at 20° C. 250 parts of 5% aqueous caustic soda was added to the formed organic layer. The obtained mixture was stirred for 30 minutes to transfer unreacted materials to the aqueous layer from the organic layer. The resulting organic layer was thrice washed with water and dehydrated with a dehydrating agent to obtain 364 parts of t-butylperoxy benzoate diluted with LUP to 50% (hereinafter abbreviated to "TBPB-LUP 50") as a final product.

EXAMPLE 2

The same procedure as the one described in the process of Example 1 was repeated except that the amount of LUP to be fed was one-third of that used in the process of Example 1. Thus, 243 parts of TBPB-LUP 75 was obtained.

EXAMPLE 3

The same procedure as the one described in the process of Example 1 was repeated except that the amount of LUP to be fed was 1.5 times as much as that used in the process of Example 1. Thus, 455 parts of TBPB-LUP 40 was obtained.

EXAMPLE 4

The same procedure as the one described in the process of Example 1 was repeated except that- no LUP was fed and 182 parts of TBPB were obtained. This TBPB was fed into a 1-l glass beaker, followed by the addition thereto of 182 parts of LUP at a room temperature. The contents were mildly stirred to obtain 364 parts of homogeneous TBPB-LUP 50.

EXAMPLE 5

The same procedure as the one described in the process of Example 1 was repeated except that 166 parts (1 mol) of 2-ethylhexanoyl chloride was used instead of benzoyl chloride and that the amount of LUP added was 210 parts. Thus, 420 parts of t-butylperoxy 2-ethylhexanoate diluted with LUP to 50% (hereinafter abbreviated to "TBPO-LUP 50") was obtained.

EXAMPLE 6

129 parts (1 mol) of TBHP-70, 92 parts of water and 172 parts of LUP were fed into a 1-l glass beaker. 170 parts (1 mol) of 25% aqueous caustic soda was added dropwise to the beaker over a period of 20 minutes while keeping the contents at 25° C. on an ice-water bath. After the completion of the dropwise addition, the temperature of the contents was lowered to 10° C., followed by the dropwise addition thereto of 126 parts (1 mol) of isopropyl chloroformate over a period of 50 minutes. The obtained mixture was stirred for 50 minutes. 250 parts of 5% aqueous caustic soda was added to the formed organic layer to transfer unreacted materials from the organic layer to the aqueous layer. The resulting organic layer was thrice washed with 250 parts of water and dehydrated with a dehydrating agent to obtain 334 parts of t-butylperoxy isopropyl carbonate diluted with LUP to 50% (hereinafter abbreviated to "TBIC-LUP 50") as a final product.

EXAMPLE 7

72 parts of methyl ethyl ketone, 125 parts of LUP and 1 part of 50% sulfuric acid were fed into a 1-l glass beaker. The contents were stirred, while maintaining the temperature at 20° C. 90 parts of 60% aqueous hydrogen peroxide was dropwise added to the beaker over a period of 60 minutes, followed by the addition thereto of a suitable amount of 5% aqueous caustic soda. The pH of the obtained mixture was adjusted to between 5 and 7. The organic layer was separated from the aqueous layer and dehydrated to obtain 215 parts of methyl ethyl ketone peroxide diluted with LUP to 50% (hereinafter abbreviated to "MEKP-LUP 50").

The curing agent compositions prepared in Examples 1 to 7 were examined for storage stability at 40° C. The curing agent composition given in Table 1 was weighed into two polyethylene tubes each having a capacity of 130 cc in an amount of 100 g per tube. The air present in the tube was expelled as completely as possible and the tube was sealed. The tube thus treated, was allowed to stand in a thermostatic chamber at 40° C. for 3 weeks to determine the amount of active oxygen contained in the curing agent composition. Further, the appearance of the composition was also observed. The results are shown in Table 1. For comparison, an organic peroxide composition containing DOP as a diluent was also examined for storage stability in a similar manner to the one described above. The results are shown in Table 1 as Comparative Examples 1 to 4.

TABLE 1

Formulation of curing agent composition diluted with liquid alkyd and storage stability thereof

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|
| Curing agent composition | | | | | | | | | | | |
| kind of curing agent composition | TBPB-LUP50 | TBPB-LUP75 | TBPB-LUP40 | TBPB-LUP50 | TBPO-LUP50 | TBIC-LUP50 | MEKP-LUP50 | TBPB diluted with DOP to 50% | TBPO diluted with DOP to 50% | TBIC diluted with DOP to 50% | MEKP diluted with DOP to 50% |
| peroxide (content) | TBPB (50) | TBPB (75) | TBPB (40) | TBPB (50) | TBPO (50) | TBIC (50) | MEKP (50) | TBPB (50) | TBPO (50) | TBIC (50) | MEKP (50) |
| diluent (content) | LUP (50) | LUP (25) | LUP (60) | LUP (50) | LUP (50) | LUP (50) | LUP (50) | DOP (50) | DOP (50) | DOP (50) | DOP (50) |
| amount of active oxygen just after the preparation | 4.04% | 5.38% | 3.24% | 4.05% | 3.65% | 4.46% | 5.10% | 4.04% | 3.62% | 4.44% | 5.10% |
| Storage stability after 14 days at 40° C. | | | | | | | | | | | |
| amount of active oxygen after 14 days at 40° C. | 4.01% | 4.01% | 3.22% | 4.03% | 3.30% | 4.46% | 5.09% | 4.04% | 3.20% | 4.42% | 5.08% |
| relative reduction of amount of active oxygen | −0.74% | −0.56% | −0.62% | −0.49% | −9.59% | −0.0% | −0.20% | −0.0% | −11.6% | −0.45% | −0.39% |
| apperance change | no | no | no | no | no | no | no | no | no | no | no |

The curing agent compositions of Examples 1 to 7 are corresponding to those prepared in Examples 1 to 7 1 ~ 7 .
The curing agent compositions of Comparative Examples 1 to 4 are those containing DOP as a diluent instead of LUP.
The appearance change was determined by observation with naked eyes.

EXAMPLES 8 TO 12

Various curing agent compositions were subjected to the storage stability test at 40° C. and 2 weeks in a similar manner to the one of Table 1. The results are shown in Table 2.

TABLE 2

Storage stability of curing agent composition (containing BHT) diluted with liquid alkyd

|  |  | Ex. 8 | Ex. 9 | Ex. 10 | Ex. 11 | Ex. 12 |
|---|---|---|---|---|---|---|
| Curing agent composition | kind of curing agent composition | TBPB-LUP50 | TBPO-LUP50 | TBPO-LUP50 | TBIC-LUP50 | MEKP-LUP50 |
|  | peroxide (content) | TBPB (50) | TBPO (50) | TBPO (50) | TBIC (50) | MEKP (50) |
|  | diluent (content) | LUP (50) | LUP (50) | LUP (50) | LUP (50) | LUP (50) |
|  | BHT (content) | (0.3) | (0.3) | (3.0) | (0.3) | (0.3) |
|  | amount of active oxygen just after the preparation | 4.06% | 3.66% | 3.53% | 4.46% | 5.07% |
| Storage stability after 14 days at 40° C. | amount of active oxygen after 14 days at 40° C. | 4.04% | 3.28% | 3.05% | 4.41% | 5.02% |
|  | relative reduction of amount of active oxygen | −0.49% | −10.38% | −13.60% | −1.12% | −0.99% |
|  | appearance change | no | no | no | no | no |

The curing agent composition of Examples 8 to 12 were each prepared by feeding LUP in the step of synthesis of the peroxide as a diluent and adding a predetermined amount of BHT to each of the obtained curing agent compositions.
The appearance change was determined by observation naked eyes.

EXAMPLES 13 TO 18

30 g of a commercially available UP resin was placed in a polyethylene cup having a capacity of 100 cc. 0.6 cc of each of the curing agent compositions of Examples 13 to 18 was added to the cup. The contents were mixed with a glass rod to obtain a homogenous mixture. This mixture was placed in a test tube, which was placed in a thermostatic chamber preliminarily adjusted to a predetermined temperature (100° C. in Examples 13 to 15, 17 and 18, and 90° C. in Example 16). After the completion of the curing, the cured product was taken out of the tube and allowed to stand at a room temperature for 2 days to determine the hardness of the cured product by the use of a Barcol hardness tester (934-1). Further, the cured product was pulverized and weighed. Then it was allowed to stand in dichloromethane for one day to completely extract the diluent remaining in the cured product. The resulting mixture was filtered to remove insolubles. The filtrate was placed in a preliminarily weighed petri dish and placed in a vacuum dryer (degree of vacuum: 15 mmHg, drying temperature: 30° C.) to remove volatiles. The resulting petri dish was weighed to determine the amount of the diluent remaining in the petri dish. The amount of the diluent extracted from the cured product is shown by a value obtained by dividing the weight of the diluent extracted from the cured product by the weight of the cured product. The results are shown in Table 3.

COMPARATIVE EXAMPLES 5 TO 8

With respect to the curing agent compositions used in Comparative Examples 1 to 4, their curing characteristics, the hardness of a product cured therewith and the amount of the diluent remaining in the product were determined in a similar manner to the one described in Examples 13 to 18. The results are shown in Table 3.

EXAMPLES 19 TO 23

The curing agent compositions of Examples 19 to 23 were examined for curing characteristics and hardness of a product cured therewith in a similar manner to the one described in Examples 13 to 18. The curing test was carried out at 100° C. in Examples 19, 22 and 23 and at 90° C. in Examples 20 and 21. The results are shown in Table 4.

TABLE 4

Curing characteristics of curing agent (containing BHT) diluted with liquid alkyd and hardness of the product cured therewith

|  |  | Ex. 19 | Ex. 20 | Ex. 21 | Ex. 22 | Ex. 23 |
|---|---|---|---|---|---|---|
| Curing agent composition | kind of curing agent composition | TBPB-LUP50 | TBPO-LUP50 | TBPO-LUP50 | TBIC-LUP50 | MEKP-LUP50 |
|  | peroxide | TBPB | TBPO | TBPO | TBIC | MEKP |
|  | (content) | (50) | (50) | (50) | (50) | (50) |
|  | diluent | LUP | LUP | LUP | LUP | LUP |
|  | (content) | (50) | (50) | (50) | (50) | (50) |
|  | BHT (content) | (0.3) | (0.3) | (3.0) | (0.3) | (0.3) |
| Curing test | gelling time | 8.6 min | 2.2 min | 2.8 min | 6.0 min | 7.7 min |
|  | curing time | 10.2 min | 3.3 min | 4.1 min | 8.1 min | 9.7 min |
|  | maximum temp. due to exothermic reaction | 238.8° C. | 234.1° C. | 234.1° C. | 231.4° C. | 233.5° C. |
|  | hardness of cured product | 41 | 37 | 37 | 42 | 41 |

The curing agent composition used in Examples 19 to 23 are corresponding to those used in Examples 8 to 12 of Table 2, respectively.
The curing test was carried out at 90° C. in Examples 20 and 21 and at 100° C. in the others.
The UP resin used in the curing test and the amount of the curing agent composition added are all the same as those described in Examples of Table 3.
The hardness of the cured product was determined by the use of a Barcol hardness tester (934-1).

An UP resin molded article cured with the curing agent composition of the present invention is superior to the one cured with a conventional curing agent composition in hardness and does not cause bleeding of the diluent. Thus, the use of the curing agent composition of the present invention is suitable for the production of implements or containers which frequently come into contact with the human body.

I claim:

1. A curing agent composition for the curing of unsaturated polyester resins which comprises from about 10% to about 80%, by weight of the composition, of an

TABLE 3

Curing characteristics of curing agent diluted with liquid alkyed, hardness of the product cured therewith and amount of the diluent remaining in the product

|  |  | Ex. 13 | Ex. 14 | Ex. 15 | Ex. 16 | Ex. 17 | Ex. 18 | Comp. Ex. 5 | Comp. Ex. 6 | Comp. Ex. 7 | Comp. Ex. 8 |
|---|---|---|---|---|---|---|---|---|---|---|---|
| Curing agent composition | kind of curing agent composition | TBPB-LUP50 | TBPB-LUP75 | TBPB-LUP40 | TBPO-LUP50 | TBIC-LUP50 | MEKP-LUP50 | TBPB diluted with DOP to 50% | TBPO diluted with DOP to 50% | TBIC diluted with DOP to 50% | MEKP diluted with DOP to 50% |
|  | peroxide | TBPB | TBPB | TBPB | TBPO | TBIC | MEKP | TBPB | TBPO | TBIC | MEKP |
|  | (content) | (50) | (75) | (40) | (50) | (50) | (50) | (50) | (50) | (50) | (50) |
|  | diluent | LUP | LUP | LUP | LUP | LUP | LUP | DOP | DOP | DOP | DOP |
|  | (content) | (50) | (25) | (60) | (50) | (50) | (50) | (50) | (50) | (50) | (50) |
| Curing test | gelling time | 5.5 min | 5.5 min | 5.6 min | 1.8 min | 3.8 min | 4.9 min | 6.0 min | 2.0 min | 4.6 min | 5.3 min |
|  | curing time | 6.8 min | 6.9 min | 6.8 min | 2.8 min | 5.7 min | 6.6 min | 7.6 min | 3.0 min | 6.5 min | 6.9 min |
|  | maximum temp. due to exothermic reaction | 237.7° C. | 238.0° C. | 237.2° C. | 233.4° C. | 235.2° C. | 235.0° C. | 233.6° C. | 232.6° C. | 235.2° C. | 232.1° C. |
|  | hardness of cured product | 42 | 41 | 42 | 38 | 42 | 41 | 35 | 33 | 39 | 36 |
| Amount of diluent extracted from cured product |  | 0.0% | 0.0% | 0.0% | 0.0% | 0.0% | 0.0% | 0.90% | 0.93% | 0.82% | 0.92% |

The curing agents used in Examples 13 to 15 and 16 to 18 and Comparative Examples 5 to 8 are the same as those used in Examples 1 to 3 and 5 to 7 and Comparative Examples 1 to 4, respectively.
The curing test was carried out at 90° C. in Example 16 and Comparative Example 6, while at 100° C. in the others.
The UP resin used in the curing test is a commercially available one. The amount of each curing agent composition added to 30 g of the UP resin is 0.4 cc in Example 14, 0.75 cc in Example 15 and 0.60 cc in the others.
The hardness of the cured product was determined by the use of a Barcol hardness tester (9340-1).

organic peroxide, and an unsaturated alkyd which is fluid at room temperature.

2. A curing agent as claimed in claim 1 wherein the organic peroxide comprises from about 10% to about 80%, by weight of the composition and the alkyd comprises from about 90% to about 10%, by weight.

3. A curing agent as claimed in any one of claims 1 or 2 wherein the alkyd comprises from about 40% to about 75% by weight of the composition.

4. A curing agent as claimed in any of claims 1 or 2 which further comprises 0.01 to 3.0% by weight of an inhibitor.

5. A process for curing an unsaturated polyester resin which comprises curing the resin in the presence of a curing agent composition which comprises from about 10% to about 80%, by weight of the composition, of an organic peroxide, and an unsaturated alkyd which is fluid at room temperature.

6. A cured unsaturated polyester resin made by the process of claim 5.

7. A process as claimed in claim 5 wherein the curing agent composition comprises from about 10% to about 80%, by weight of the composition, of an organic peroxide, and from about 90% to about 10%, by weight, of an unsaturated alkyd.

* * * * *